United States Patent [19]

Alten

[11] Patent Number: 4,694,522
[45] Date of Patent: Sep. 22, 1987

[54] TRANSFER BRIDGE

[76] Inventor: Kurt Alten, Ringstr. 14, D-3015 Wennigsen, Fed. Rep. of Germany

[21] Appl. No.: 833,900

[22] Filed: Feb. 26, 1986

[30] Foreign Application Priority Data

Feb. 26, 1985 [DE]  Fed. Rep. of Germany ....... 3506723

[51] Int. Cl.$^4$ .................. B65G 11/12; B65G 11/18
[52] U.S. Cl. .................................. 14/71.1; 14/72.5; 14/71.7; 104/121; 193/5
[58] Field of Search ............ 14/71.1, 71.3, 71.7, 14/72.5; 104/121; 198/318; 193/5

[56] References Cited

U.S. PATENT DOCUMENTS

| | | | |
|---|---|---|---|
| 1,627,548 | 5/1927 | Badura | 14/71.1 X |
| 3,018,496 | 1/1962 | Hosbein | 14/71.7 |
| 3,533,118 | 10/1970 | Rosengren | 14/71.7 |
| 3,665,537 | 5/1972 | Turner | 14/71.7 |
| 3,699,599 | 10/1972 | Lapham | 14/71.3 |
| 3,886,614 | 6/1975 | Rosengren | 14/71.7 |
| 4,338,864 | 7/1982 | Ziegenfus | 104/121 |

*Primary Examiner*—Stephen J. Novosad
*Assistant Examiner*—John F. Letchford
*Attorney, Agent, or Firm*—Becker & Becker, Inc.

[57] ABSTRACT

A transfer bridge for bridging across railroad tracks. The transfer bridge includes a bridge plate that can be pivoted from a vertical rest position into a horizontal operative position, in which the free end of the bridge plate rests upon a platform next to the tracks. In addition, a travel mechanism that is movable parallel to the tracks is associated with the bridge. In order to achieve a simplified and smaller construction for the travel mechanism, the latter is provided with an upwardly extending boom that is held in a guide rail to keep it from tilting.

4 Claims, 3 Drawing Figures

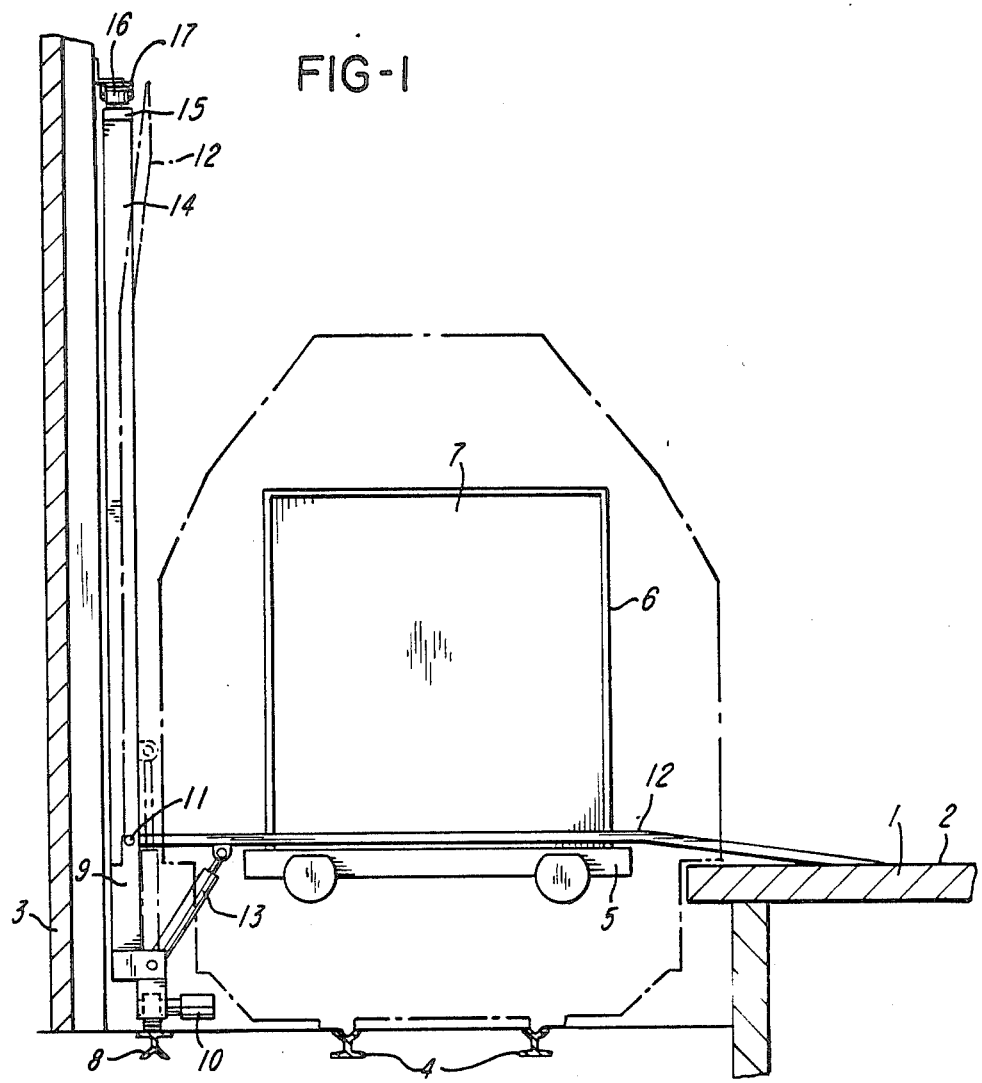

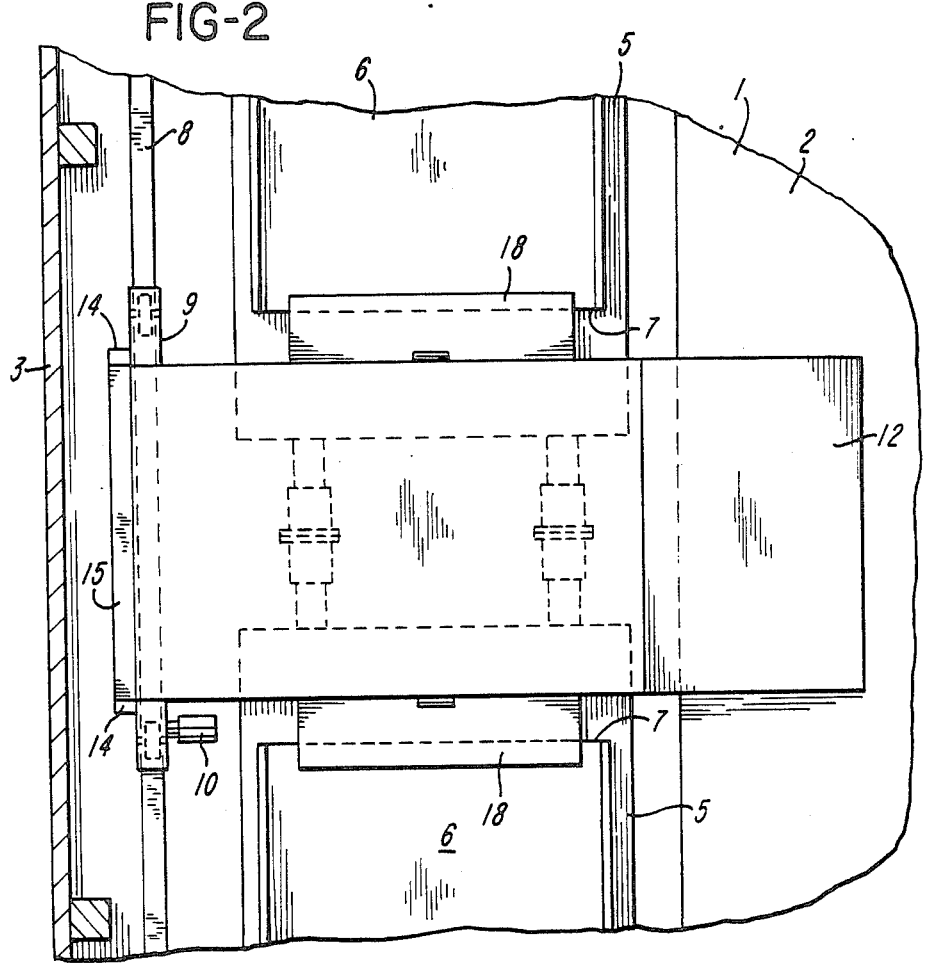
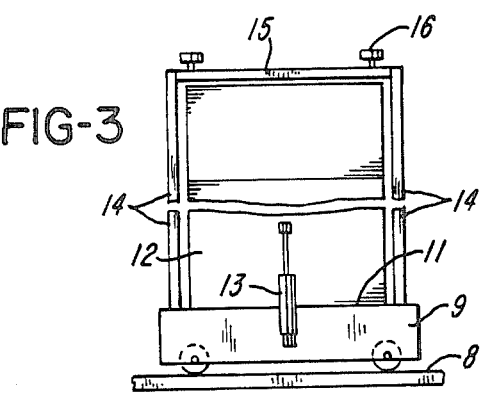

TRANSFER BRIDGE

BACKGROUND OF THE INVENTION

1. Field of the Invention

The present invention relates to a crossover or transfer bridge for bridging across railroad tracks. The transfer bridge includes a bridge plate that is pivotably mounted on one side of the tracks in such a way that it can be pivoted about a horizontal axis between an approximately vertical rest position, and an approximately horizontal operative position in which the free end of the bridge plate rests on a platform located on the opposite side of the tracks. To effect the pivotable mounting of the bridge plate, a travel mechanism is provided that is movable on a guide rail parallel to the tracks.

2. Description of the Prior Art

With heretofore known transfer bridges of this general type, the travel mechanism is embodied in such a way that it must absorb not only the vertical supporting forces or bearing pressures of the bridge plate in its rest position and its operative position, but must also absorb the pivot torque that results when the bridge plate is pivoted up or down. The forces that occur during this process are relatively great, because the bridge plates for such applications must be able to extend over considerable lengths. These conditions require considerable technical effort for the construction and mounting of the travel mechanism.

An object of the present invention is to avoid the aforementioned drawbacks. Therefore, it is a further object of the present invention to provide a structurally simpler travel mechanism that is operationally reliable and has smaller dimensions, in particular having a lesser depth.

BRIEF DESCRIPTION OF THE DRAWING

These objects, and other objects and advantages of the present invention, will appear more clearly from the following specification in conjunction with the schematic drawing, in which:

FIG. 1 is a side view, taken in the direction of the railroad tracks, of one exemplary inventive embodiment of a transfer bridge for bridging railroad tracks, and in particular is shown in the operative position;

FIG. 2 is a plan view of the transfer bridge of FIG. 1; and

FIG. 3 shows the transfer bridge of FIG. 1 with the bridge plate in the folded-up position, with the view being taken at right angles to the railroad tracks.

SUMMARY OF THE INVENTION

The transfer bridge of the present invention is characterized primarily in that the travel mechanism is provided with an upwardly extending boom means, which above the aforementioned pivot axis is held in a guide rail to keep it from tilting.

In particular, the inventive transfer bridge comprises: first guide rail means disposed on that side of the tracks remote from the platform, with this guide rail means extending parallel to the tracks; a travel mechanism that is movably disposed on the first guide rail means in such a way that it is movable parallel to the tracks, with the pivotable mounting of the bridge plate being effected by pivotably mounting this bridge plate on the travel mechanism; arm or boom means connected to the travel mechanism and extending upwardly therefrom away from the first guide rail means; and second guide rail means disposed above the horizontal pivot axis for holding the boom means in place to keep the latter from tilting.

The present invention proceeds from the recognition that in operations utilizing railroad tracks there is generally no space limitation above the tracks, although there is often limited space to the sides of the track. Thus, if an upwardly extending boom means is utilized, it is possible to use a travel mechanism that need only be dimensioned for vertical forces and, in the bottom region, for horizontal forces. Such a travel mechanism can be very narrow, and can even be disposed in the space between the wall of a building and tracks that are disposed very close to this wall. Such a boom means expediently has a length that corresponds essentially to the length of the bridge plate. Accordingly, it is also advantageous to dispose the guide rail for the boom means in that region that is defined by the top of the bridge plate when the latter is folded up. The boom means, along with the guide means therefor, is thus disposed at a height that is required anyway for the bridge plate when the latter is folded up.

Further specific features of the present invention will be described in detail subsequently.

DESCRIPTION OF PREFERRED EMBODIMENTS

Referring now to the drawing in detail, rails 4 are desposed between a ramp, dock, or other platform 1, which is provided with the surface 2, and the outer wall 3 of a building. The railroad cars 5 are coupled to one another, and are loaded with containers 6 that are accessible only from the end face or side 7 thereof.

Disposed parallel to the rails or tracks 4, and at the same level, is a lower guide rail 8 for a travel mechanism 9 that is provided with an electrical drive motor 10. Disposed approximately at the level of this travel mechanism is a horizontal pivot axis 11 for a bridge plate 12 that can be moved via a working cylinder 13 from the operatie position shown in FIG. 1, in which the front of the bridge plate 12 rests upon the surface 2, into the vertical rest position (shown by dashed lines), and vice versa.

From both sides, near the bridge plate 12, are rigid arms or booms 14 that are connected at the bottom to the travel mechanism 9, and are interconnected at the top by a horizontal crosspiece 15 that is disposed at the level of the top of the bridge plate 12 when the latter is in the folded-in state (see FIG. 3). The crosspiece 15 serves for the mounting of two rollers 16, each of which has a vertically disposed axis of rotation. The rollers 16 are guided in an upper guide rail 17 in such a way as to deep the booms 14, and hence the travel mechanism 9, from tilting.

Disposed on both sides of the bridge plate 12 are transfer plates 18 (FIG. 2) that permit access to the container 6.

The two booms 14, the crosspiece 15, and the upper guide rail 17 are located in the region of the building; this is the region that is required anyway for accommodating the folded-in bridge plate 12. Therefore, the inventive arrangement requires no additional space. The travel mechanism 9 can be kept very small, and the lower guide rail 8 can therefore be disposed very close to the outer wall 3. As shown in FIG. 3, a particularly advantageous embodiment is the formation of a frame from the travel mechanism 9, the two booms 14 and the cross-piece 15. This frame receives the bridge plate 12 within it, and imparts a particularly high rigidity and stability to the overall construction.

The present invention is, of course, in no way restricted to the specific disclosure of the specification and drawing, but also encompasses any modifications within the scope of the appended claims.

What I claim is:

1. A transfer bridge for bridging across railroad tracks; said transfer bridge including a bridge plate that has a free end and that is pivotably mounted on one side of the tracks in such a way that it can be pivoted about a horizontal pivot axis between an approximately vertical rest position, and an approximately horizontal operative position in which the free end of the bridge plate rests on a platform located on the opposite side of the tracks remote from that one side of the tracks where said bridge plate is pivotally mounted; said transfer bridge further comprising:

a first guide rail means disposed on that side of said tracks remote from said platform, with said first guide rail means extending parallel to said tracks;

a travel mechanism movably disposed on said first guide rail means in such a way that it is movable parallel to said tracks; the pivotable mounting of said bridge plate being effected by pivotably mounting the latter on said travel mechanism;

boom means connected to said travel mechanism and extending upwardly therefrom away from said first guide rail means;

second guide rail means disposed above said horizontal pivot axis for holding said boom means in such a way that the latter cannot tilt;

said boom means including a separate boom on each side of said bridge plate, when viewed from said platform, and a horizontal crosspiece for connecting said booms;

said crosspiece being disposed at a height corresponding approximately to the height of that end of said bridge plate remote from said horizontal pivot axis when said bridge plate is in its vertical rest position;

said travel mechanism, said two separate booms, and said crosspiece rigid frame defining a plane;

said bridge plate, when in its vertical rest position, being essentially disposed with said frame, i.e. within the plane defined by said frame.

2. A transfer bridge according to claim 1, which includes rollers mounted on said crosspiece, with said rollers being guided by said second guide rail means to effect said holding of said boom means.

3. A transfer bridge according to claim 1, in which said first guide rail means is associated with that portion of said travel mechanism remote from said boom means; and in which said second guide rail means is associated with that portion of said boom means remote from said travel mechanism.

4. A transfer bridge according to claim 1, in which said second guide rail means is disposed in the region of that end of said bridge plate remote from said horizontal pivot axis when said bridge plate is in its vertical rest position.

* * * * *